Patented Feb. 15, 1949

2,461,847

UNITED STATES PATENT OFFICE 2,461,847

PROCESS FOR THE PREPARATION OF
dl-THREONINE

Anthony C. Shabica, Rahway, N. J., assignor to Merck & Co., Inc., Rahway, N. J., a corporation of New Jersey No Drawing. Application May 10, 1946,
Serial No. 668,770

11 Claims. (Cl. 260—534)

This invention relates to a method of separating racemic mixtures of amino acids. More particularly, it is concerned with the isolation of dl-threonine from a mixture of dl-threonine and dl-allothreonine and to novel derivatives of the racemic mixtures which permit their ready separation.

In accordance with several syntheses of dl-threonine, this essential amino acid is obtained in the form of a mixture of dl-threonine and dl-allothreonine. Since dl-allothreonine is physiologically inactive, it is desirable that it be separated from dl-threonine.

Heretofore, isolation of dl-threonine from the two racemic mixtures has been accomplished with difficulty. Thus, according to a method published in the Journal of Biological Chemistry, a mixture of the benzoyl derivatives of dl-threonine and dl-allothreonine is separated by crystallization from water. Benzoyl-dl-allothreonine is the less soluble isomer, and it is therefore necessary to precipitate substantially all of this compound before the desired isomer, benzoyl-dl-threonine, can be isolated from the residues. Large losses are involved in the several crystallizations required to obtain the pure isomer. The second method disclosed in the same publication describes the separation of the two racemic mixtures by precipitation of the benzoyl or formyl derivative of dl-O-methylthreonine. The separation of the isomers is incomplete and the benzoyl or formyl dl-O-methylthreonine remaining in solution is recovered by fractional crystallization.

A method published in the Journal of the American Chemical Society, involves the separation of the two racemic mixtures by fractional crystallization from water. Unfortunately, the desired dl-threonine is more soluble than its stereoisomer and the isolation is accomplished with difficulty.

It is an object of this invention to provide a method for the separation of the amino isomer which eliminates tedious fractional crystallization and the complicated procedure and apparatus necessarily employed when the isomers are isolated in this manner.

It is another object of this invention to provide pure dl-threonine without resorting to the preparation of benzoyl and formyl derivatives of dl-O-methylthreonine.

Another object of this invention is to obtain essentially quantitative yields of the isomers as compared with extremely poor yields obtained by fractional crystallization separation. The process, according to the present invention, is also adaptable for large scale production.

It is still another object of this invention to isolate dl-threonine from two racemic mixtures which contain as little as 50% dl-threonine. The methods previously available were applicable only to mixtures which contain a much higher percentage of dl-threonine.

Regarded in certain of its broader aspects, the process, according to the present invention comprises dissolving sodium or sodium hydroxide in alcohol and reacting the solution thus formed with a mixture of dl-threonine and dl-allothreonine to precipitate dl-threonine sodium salt and converting the latter salt to dl-threonine.

In a preferred embodiment of my improved procedure, sodium is first dissolved in alcohol and a mixture of dl-threonine and dl-allothreonine is added. The extremely insoluble dl-threonine sodium salt precipitates almost quantitatively while the very soluble dl-allothreonine salt remains in solution. Various methods of converting the dl-threonine sodium salt to the free acid can be employed. In accordance with one procedure, dl-threonine sodium salt is dissolved in hydrochloric acid and diluted with alcohol thus precipitating sodium chloride. The precipitate is removed and the filtrate containing dl-threonine hydrochloride is then treated with a weak base such as aniline or pyridine and dl-threonine is recovered. Another method of decomposing dl-threonine sodium salt to form the free acid involves treating an aqueous solution of the racemic salt with a weak acid, such as glacial acetic acid and recovering dl-threonine. Alternatively, dl-threonine can be obtained by treating dl-threonine sodium salt with a hydrogen ion exchange resin to form dl-threonine.

While the present invention is not restricted to the use of any particular mixture of dl-threonine and dl-allothreonine, I have found that mixtures containing at least 50% dl-threonine are most satisfactorily treated. Mixtures containing less than 50% dl-threonine, however, have been separated according to the process of the present invention.

In preparing dl-threonine sodium salt in accordance with the process of the present invention, the mixture of dl-threonine and dl-allothreonine can be treated with a solution prepared by dissolving sodium or sodium hydroxide in alcohol. The term alcohol as used in the specification and claims includes methanol, ethanol, propanol and other monohydroxy alcohols.

The following examples set forth a method of carrying out the invention:

Example 1

15.63 g. of a mixture of dl-threonine and dl-allothreonine (83% dl-threonine) was added to a hot sodium ethylate solution, prepared by dissolving 3.02 g. of sodium in 60.4 cc. of ethanol. The mixture was refluxed on a steam bath for 5 minutes to insure complete solution. Shortly after all of the solid had dissolved, a white crystalline material precipitated. The mixture was allowed to stand for 16 hours at 20° to 25° C. The crystalline material, dl-threonine sodium salt, was then removed by filtration, slurried with ethanol and dried. dl-Threonine sodium salt had a melting point of 170–172° C. dec.

15.0 g. of dl-threonine sodium salt was dissolved in 18.5 cc. of cold hydrochloric acid. The thick slurry was stirred to break up all lumps, diluted with 120 cc. of isopropanol and heated on a steam bath to 60° C., with stirring, for ten minutes. The mixture was then cooled to 0° C. for 12 hours with occasional stirring. The solution was filtered and the precipitated sodium chloride slurried with 5 cc. of isopropanol. The filtrate containing dl-threonine hydrochloride, was then heated to 60° C. and 20.4 cc. of aniline was added. The clear solution was seeded with crystals of dl-threonine. After standing overnight in the icebox, the solution was filtered, the crystalline material washed with isopropanol and dried. Microbial assay showed this material to be substantially pure dl-threonine melting point 234–235° C.

In order to remove traces of chloride ion present in the dl-threonine obtained above, this material was dissolved in 28.8 cc. of hot water, filtered and diluted with 86.4 cc. of hot ethanol. The solution was cooled slowly to 0° C. and held at this temperature for 12 hours. The solution was then filtered. The dl-threonine recovered was dried.

Example 2

4.0 g. of a mixture of 50% dl-threonine and dl-allothreonine was added to a hot sodium ethylate solution, prepared by dissolving 0.773 g. of sodium in 19.2 cc. of ethanol. The mixture was refluxed on a steam bath until solution was complete and then cooled to room temperature. After seeding with crystals of dl-threonine sodium salt and standing for 5 hours, the white crystalline dl-threonine sodium salt was removed by filtration, washed and dried.

1.9 g. of dl-threonine sodium salt was dissolved in 4 cc. of water, acidified with 0.4 cc. of glacial acetic acid and diluted with 7 cc. of ethanol. The mixture was cooled in the icebox for 16 hours and then filtered. The precipitated dl-threonine was washed and dried.

Example 3

22.9 g. of a mixture of dl-threonine and dl-allothreonine (85% dl-threonine) was added to a hot sodium hydroxide-ethanol solution, prepared by dissolving 7.68 g. of sodium hydroxide in 88 cc. of ethanol. The mixture was refluxed for 10 minutes, cooled and allowed to stand in the icebox overnight. The white crystalline dl-threonine sodium salt was removed by filtration, washed and dried.

5.0 g. of dl-threonine sodium salt was dissolved in 75 cc. of water. The pH of the mixture was 10.35. Amberlite IR-100, a completely cured phenol formaldehyde synthetic resin, C stage, was added to the basic solution in small portions until the pH of the solution was 5.5, which is the pH of pure dl-threonine. 35.13 g. of resin was required. The mixture was filtered and the resin extracted twice with 50 cc. portions of hot water. The aqueous fractions were then concentrated separately to dryness in vacuo and substantially dl-threonine was obtained.

Example 4

5.0 g. of a mixture of dl-threonine and dl-allothreonine (70% dl-threonine) was added to a hot sodium propoxide solution prepared by dissolving 0.97 g. of sodium in 40 cc. of isopropanol. The mixture was refluxed on a steam bath until solution was complete and then cooled to room temperature. A white precipitate of dl-threonine sodium salt formed and was recovered by filtration. The crystals were washed with isopropanol and dried.

7.0 g. of dl-threonine sodium salt were dissolved in 140 cc. of water and passed through a column of Amberlite IR-100, at the rate of 5 cc. per minute. Fractions of 5 cc. were taken for determination of the point where the sodium salt broke through. The column was washed with water until free of the sodium salt. 150 cc. of water was required. All of the fractions free of sodium were combined and concentrated to dryness in vacuo to form dl-threonine.

Example 5

0.97 g. of sodium was dissolved in 19.3 cc. of methanol and 5.0 g. of a mixture of dl-threonine and dl-allothreonine (70% dl-threonine) was added to the warm solution. The mixture was refluxed on a steam bath until solution was complete and then cooled to room temperature. 19.3 cc. of absolute ether was added slowly and the mixture was scratched. After several minutes a white precipitate of dl-threonine sodium salt was obtained. The precipitate was removed by filtration and washed with 50:50 ethanol ether solution.

Various changes and modifications may be made in my process, certain preferred embodiments of which are described herein, which changes and modifications would, nevertheless, be within the scope of my invention. It is my intention that such changes and modifications, to the extent that they are within the scope of the appended claims, shall be considered as part of my invention.

I claim:

1. In the process for the separation of dl-threonine and dl-allothreonine, the step which comprises reacting a mixture of dl-threonine and dl-allothreonine with a lower alkyl monohydric alcohol solution of a substance selected from the group consisting of sodium and sodium hydroxide.

2. In the process for the separation of dl-threonine and dl-allothreonine, the steps which comprise reacting a mixture of dl-threonine and dl-allothreonine with a hot lower alkyl monohydric alcoholic solution of sodium and cooling the reaction mixture thereby precipitating dl-threonine sodium salt.

3. In the process for the separation of dl-threonine and dl-allothreonine, the steps which comprise reacting a mixture of dl-threonine and dl-allothreonine with a hot lower alkyl monohydric alcoholic solution of sodium hydroxide and cooling the reaction mixture thereby precipitating dl-threonine sodium salt.

4. In the process for the separation of dl-threonine and dl-allothreonine, the steps which comprise reacting a mixture of dl-threonine and dl-allothreonine with a hot solution of sodium in ethyl alcohol and cooling the reaction mixture thereby precipitating dl-threonine sodium salt.

5. The process for the separation of dl-threonine and dl-allothreonine, which comprises reacting a mixture of dl-threonine and dl-allothreonine with a lower alkyl monohydric alcoholic solution of a substance selected from the group consisting of sodium and sodium hydroxide thereby precipitating dl-threonine sodium salt, and converting the latter sodium salt to dl-threonine.

6. The process for the separation of dl-threonine and dl-allothreonine, which comprises reacting a mixture of dl-threonine and dl-allothreonine with a lower alkyl monohydric alcoholic solution of a substance selected from the group consisting of sodium and sodium hydroxide thereby precipitating dl-threonine sodium salt, removing said precipitate from solution by filtration and treating the dl-threonine sodium salt with an acidifying medium to convert the same to dl-threonine.

7. The process for the separation of dl-threonine and dl-allothreonine, which comprises reacting a mixture of dl-threonine and dl-allothreonine with a lower alkyl monohydric alcohol solution of a substance selected from the group consisting of sodium and sodium hydroxide thereby precipitating dl-threonine sodium salt, removing said precipitate from solution by filtration, dissolving the dl-threonine sodium salt in a hydrohalic acid thereby precipitating the corresponding sodium halide, removing the sodium halide by filtration, reacting the filtrate with a weak base and seeding the solution with crystals of dl-threonine.

8. The process that comprises reacting a mixture of dl-threonine and dl-allothreonine with a lower alkyl monohydric alcoholic solution of a substance selected from the group consisting of sodium and sodium hydroxide thereby precipitating dl-threonine sodium salt, and reacting the latter salt with a hydrogen ion exchange resin.

9. The process for the separation of dl-threonine and dl-allothreonine, which comprises reacting a mixture of dl-threonine and dl-allothreonine with a hot lower alkyl monohydric alcoholic solution of sodium, cooling the reaction mixture thereby precipitating dl-threonine sodium salt, removing said precipitate by filtration, dissolving the dl-threonine sodium salt in hydrochloric acid, diluting the latter mixture with isopropyl alcohol, heating the reaction mixture, cooling the mixture thereby precipitating sodium chloride, removing said sodium chloride by filtration, heating the filtrate containing dl-threonine hydrochloride with aniline and seeding the solution with crystals of dl-threonine.

10. The process for the separation of dl-threonine and dl-allothreonine, which comprises reacting a mixture of dl-threonine and dl-allothreonine with a hot lower alkyl monohydric alcoholic solution of sodium, cooling the reaction mixture thereby precipitating dl-threonine sodium salt, removing said percipitate by filtration, dissolving the dl-threonine sodium salt in water and reacting the aqueous solution with a hydrogen ion exchange resin.

11. The process for the separation of dl-threonine and dl-allothreonine, which comprises reacting a mixture of dl-threonine and dl-allothreonine with a hot lower alkyl monohydric alcoholic solution of sodium hydroxide, cooling the reaction mixture thereby precipitating dl-threonine sodium salt, removing said precipitate by filtration, dissolving the dl-threonine sodium salt in hydrochloric acid, diluting the latter mixture with isopropyl alcohol, heating the reaction mixture, cooling the mixture thereby precipitating sodium chloride, removing said sodium chloride by filtration, heating the filtrate containing dl-threonine hydrochloride with aniline and seeding the solution with crystals of dl-threonine.

ANTHONY C. SHABICA.

REFERENCES CITED

The following references are of record in the file of this patent:

UNITED STATES PATENTS

| Number | Name | Date |
| --- | --- | --- |
| 2,023,890 | Kuss et al. | Dec. 10, 1935 |
| 2,306,646 | Shildneck | Dec. 29, 1942 |
| 2,371,245 | Lee | Mar. 13, 1945 |

OTHER REFERENCES

Egroff: "Chem. Zent.," 1903, II, page 554.

Burch: "Jour. Chem. Soc." (London), pages 311–312, 1930.

Abderhalden et al.: "Ber. Deut. Chem. Ges.," vol. 67 (1934), page 542.

Plimmer: "Biochem. J.," vol. 35 (1941), pages 466–467.

Carter et al.: "J. Biol. Chem.," vol. 138, pages 628 and 629.